United States Patent [19]

Laurin

[11] 3,994,988

[45] Nov. 30, 1976

[54] THERMOPLASTIC COPOLYMERS OF POLYSILOXANE POLYCARBONATE AND POLYESTER CONSTITUENTS

[75] Inventor: Dean G. Laurin, Mount Prospect, Ill.

[73] Assignee: Baxter Travenol Laboratories, Inc., Deerfield, Ill.

[22] Filed: Apr. 12, 1976

[21] Appl. No.: 675,799

Related U.S. Application Data

[63] Continuation-in-part of Ser. No. 556,616, March 10, 1975, abandoned.

[52] U.S. Cl............................................. 260/824 R
[51] Int. Cl.$^2$......................................... C08L 83/00
[58] Field of Search.................. 260/824 R, 46.5 G

[56] References Cited
UNITED STATES PATENTS

| | | | |
|---|---|---|---|
| 2,999,835 | 9/1961 | Goldberg | 260/824 X |
| 3,207,814 | 9/1965 | Goldberg | 260/824 X |
| 3,379,790 | 4/1968 | Krauss et al. | 260/824 R |
| 3,701,815 | 10/1972 | Matzner et al. | 260/824 R |
| 3,832,419 | 8/1974 | Merritt | 260/824 R |

*Primary Examiner*—Lewis T. Jacobs
*Attorney, Agent, or Firm*—Paul C. Flattery; Garrettson Ellis

[57] ABSTRACT

There is disclosed thermoplastic silicone copolymers having polyarylcarbonate and polyarylester constituents covalently bound to a polydiorganosiloxane constituent. The copolymer is produced by reacting a dihydric phenol with a difunctional polydiorgano siloxane, an organo-diacid halide or with alkyl or aryl ester of an organo-diacid, and with phosgene or other suitable carbonate precursors. The reactions are carried out in suitable organic solvents that solubilize the reagents and the resulting copolymer, in the presence of conventional catalysts. In another embodiment a solvent system is eliminated and the condensation polymerization is carried out in a molten system.

23 Claims, No Drawings

THERMOPLASTIC COPOLYMERS OF POLYSILOXANE POLYCARBONATE AND POLYESTER CONSTITUENTS

CROSS REFERENCE TO RELATED APPLICATION

This application is a continuation-in-part of U.S. application Ser. No. 556,616, filed Mar. 10, 1975, now abandoned.

BACKGROUND OF THE INVENTION

It will be appreciated that copolymeric compositions are well known, and further, that literally thousands of such polymers have been disclosed. Additionally, copolymeric compositions are well known where a silicone constitutes a major and essential consitutent. Within the silicone copolymer may be either carbonate identifiable groups or ester identifiable groups.

With regard to the presence of a carbonate group in a polysiloxane copolymer, attention is directed to U.S. Pat. No. 2,999,845 to Eugent P. Goldberg. Simply stated, the compositions of Goldberg comprise dihydric phenol derived groups linked by both carbonate and siloxy groups. With regard to the presence of an ester group in a polysiloxane copolymer, attention is directed to U.S. Pat. No. 3,701,815 to Matzner, et al. The patentees thereof disclose therein a thermoplastic siloxane-polyester block copolymer having siloxane blocks that are linear and contain dihydrocarbyl-siloxane groups and polyester blocks that are linear and contain groups derived from aromatic dicarboxylic acids and aromatic diols.

None of the prior art workers have disclosed the concept of providing a thermoplastic silicone copolymer wherein there is included aromatic carbonate and aromatic ester groups all well defined and present in specific proportions to provide materials which are capable of withstanding heat sterilizing temperatures (at least 100° C.) to permit use in medical equipment, yet which can also be radio frequency dielectrically-sealed, for efficient and convenient manufacturing of flexible films, bags, tubing components, and the like made of the material.

The present invention relates to this concept, i.e. a heat-sterilizable, R.F. dielectric-sealable thermoplastic silicone copolymer, and a method for producing it.

The organic polymer component may be crystalline or amorphous at the temperature of use. Consequently, at the temperature of use, the copolymers are strong plastics which may be rigid or flexible whereas at higher temperatures the copolymer is a viscous liquid which may be fabricated by conventional thermoplastic methods. The constituents in the polymer, as will be seen below, may be combined in different ratios and with varying molecular sizes with respect to the constituents, so as to produce copolymers which have a wide range of mechanical and thermal properties, both at the use temperatures and at the melt fabrication temperatures.

CHARACTERISTICS AND UTILITIES OF THE INVENTION

The copolymers of this invention will in most cases be transparent, strong, soluble in specific solvents, and extremely stable towards degradation by heat, light, water and other chemicals.

It has been discovered that permeability of the copolymers of the present invention depend to a considerable degree on the nature and properties of the constituents. For example, it is possible to adjust the moieties of the constituents whereby a resultant film may be obtained having excellent oxygen permeabilities approaching that of poly (dimethylsiloxane), which is probably the most permeable of all known non-porous solids. On the other hand, the constituents may be adjusted to achieve a copolymer having a low degree of permeability to oxygen, perhaps even lower than plasticized polyvinylchloride of comparable flexibility. As a result, this wide range of permeability to small molecules such as $O_2$, $N_2$, $CO_2$, or $H_2O$, permits the copolymer of the present invention to be useful for a wide range of applications. Some of the copolymers may be employed in the fabrication of containers (i.e., barriers to permeation) whereas others are useful as separators (i.e., selective permeation).

Usually, the copolymers may be subjected to steam sterilization at a desirable temperature of about 120° C. without undue distortion or loss of clarity or leaching.

These copolymers generally are not affected by polar and hydrogen-bonding solvents, such as ethyl alcohol, water, glycerol, dimethylsulfoxide or dimethylformamide. On the other hand, these same copolymers may be dissolved and cemented together or with other materials by solvents such as chlorinated aliphatics (e.g. methylene chloride, chloroform, 1,1,1-trichloroethane), aromatic hydrocarbons and their chlorinated derivatives (e.g., toluene, benzene, xylene, naphthalene, chlorobenzene, orthodichloro-benzene, 1,2,4-tirchlorobenzene) ketones (e.g., methyl ethyl ketone, acetone, cyclohexanone), and ethers (e.g., tetrahydrofuran, 1,2-dimethoxyenthane, diphenyl ether).

It will be readily apparent to those skilled in the art that these copolymers are especially useful for medical applications in which they contact biological fluids or tissues, or drugs which are to be administered intravenously or otherwise. The copolymers have been found to be stable, non-toxic, non-leaching (i.e., showing a lack of migration of chemicals from the copolymer), and compatible with biological matter (e.g., blood fractions, whole blood, tissues), Such applications include especially containers for blood and blood component collection, transfer and storage (at minus 196° C. or higher temperatures); tubing accessories (e.g., filters, connectors) for transfer of intravenous solutions; manifolds and other units of artificial organs (e.g., blood oxygenators, blood heat exchangers, membrane kidney, blood pumps, heart assist devices), bubble-type blood oxygenators and accessories (tubings, connectors, spargers, defoamer sponge, urinary drainage Foley catheters, contact eye lenses, organ support devices (e.g., kidney and liver containment and fluid circulation), various surgical devices (e.g., blood suction, filtration and transfer), plastic syringes (e.g., prefilled syringe cylinders, plungers and seals), membranes for exchange of oxygen and carbon dioxide in artificial lungs, and controlled diffusion of drugs from delivery systems to patients.

SCOPE OF THE INVENTION

The present invention is concerned with thermoplastic silicone copolymers having poly (diorganosiloxane) components which are covalently bonded to condensation type organic polymer components. This is accomplished so that these two polymer components are connected in an end-to-end relationship in an alternating manner.

Generally, the compounds of this application may be prepared by: reacting one molar part of a diorganopolysiloxane having hydrolyzable endgroups with more than 2 and less than 10 molar parts of a dihydric phenol;

reacting the resulting product with a difunctional organic acid halide, to produce polyester moieties at each end of the polysiloxane by chain-forming reaction between the remaining dihydric phenol and the difunctional organic acid halide; the organic acid halide being present in less than a stoichiometric quantity sufficient to react completely with said dihydric phenol; and thereafter reacting the resulting product by gradual addition of an organo carbonate precursor, the polysiloxane being present in the final product in the amount of 45 to 60 percent by weight, and having a molecular weight of 300 to 3,000, preferably about 500 to 1200, and, when bisphenol A and terephthalic acid halide is exclusively used, in their respective functions, from 700 to 1,000.

The mole ratio of the difunctional organic acid to the organo carbonate precursor is generally from 1/2 to 9/1, the numerator in each case reflecting the moles of difunctional organic acid present and the denominator indicating the moles of organo carbonate precursor present.

It is generally preferred for the mole ratio of the difunctional organic acid and the organo carbonate precursor to be from about 1 to 1 to about 5 to 1. It is generally preferable to keep the ratio below 5/1 when the molecular weight of the silicone component is at the higher end of the range, particularly greater than 1200, if both good sterilizing temperature strength and R. F. sealability is desired in the plastic product. When the silicone molecular weight is 2000 or greater, the above ratio is desirably about 1/1 to 3/1.

Similarly, it is preferable for the total amount of polysiloxane present in the final product to be no more than about 50 percent by weight when higher molecular weight polysiloxane materials are used, i.e. having a molecular weight of over about 1200.

The copolymer of the present invention may be produced by several process variations. They may be produced by reaction in solution between the difunctionally reactive silicone, dihydric phenol and an organodiacid halide, with or without a catalyst, or an alkyl or aryl ester of organodiacid using a transesterification catalyst. When a constituent is an organodiacid halide, the preferred catalyst is pyridine or a trialkylamine. Useful transesterification catalysts for the purposes herein intended are tetrabutylorthotitanate, magnesium or its oxide, antimony oxide, stannous octate, or dialkyl tin alkylates.

Recovery and purification of the product copolymer is effected by precipitation of the copolymer in a nonsolvent, such as methanol, ethanol, isopropanol or acetone when an organodiacid halide has been employed as one of the constituents. When one of the constituents has been an alkyl or aryl ester of an organodiacid, precipitation recovery is applicable or the solvent may be evaporated while the catalyst is deactivated by exposure to heat, water vapor, oxygen or other suitable reactant depending on the nature of the catalyst.

It is also within the purview of the invention to obtain copolymerization wherein the reagents are in a molten condition. In such a melt method the resultant copolymer is obtained by cooling the reaction mixture and deactivating the catalyst by conventional well known means such as by exposure to further heat, water vapor, oxygen or the other reactants, depending on the nature of the catalyst.

Any dihydric phenol compound capable of a polycondensation type reaction is useful in the practice of this invention, such dihydric phenol being defined as a monoaryl or polyaryl phenol type material in which the hydroxyl groups are attached directly to aromatic ring carbon atoms. The dihydric phenol compounds used in connection with the invention can typically be represented by the general formula:

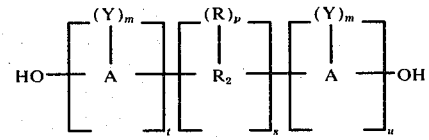

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.), as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene or alkylidene residue such as methylene, ethylene, propylene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, etc. $R_2$ can also consist of two or more alkylene or alkylidene groups such as above, separated by an aromatic group, a tertiary amino group, an ether group, a carbonyl group, silane radical or siloxy radical, or by a sulfur-containing radical such as sulfide, sulfoxide, sulfone, etc. $R_2$ may also be a dibasic acid ester residue derived from, for example, dibasic acids such as adipic, azelaic, sebacic, isophthalic, terephthalic and alkyl or aryl glycols and dihydric phenols. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b), and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

In the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitrol group can be represented by Y. Where $s$ is zero in Formula I, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (i.e., bisphenol-A); 2,2-bis(4-hydroxy-3,5-dichlorophenyl-propane (i.e., tetrachlorobisphenol-A); 2,4'-dihydroxydiphenyl-methane; bis-(2-hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-2,5-dimethyl-4-hydroxy-phenyl)-ethane; 1,3-bis-(3-methyl-4-hydroxynaphthyl)-propane; 2,2-bis-(3-phenyl-4-hydroxyphenyl)-propane; 2,2-bis-(3-isopropyl-4hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxyphenyl)-phenyl methane; bis-(4-hydroxyphenyl)-cyclohexyl methane; 1,2-bis-(4-hydroxyphenyl)-1,2-bis-(phenyl)ethane; 2,2-bis-(4-hydroxyphenyl)-1,3-bis-(phenyl) propane; 2,2-bis-(4-hydroxyphenyl)-1-phenyl propane; and the like. Also included are dihydroxybenzenes typified by hydro-quinone and resorcinol, dihydroxydiphenyls such as 4,4'-dihydroxydiphenyl; 2,2'-dihydroxydiphenyl; 2,4'-dihydroxy-diphenyl; dihydroxy-naphthalenes such as 2,6-dihydroxynaphthalene, etc. Dihydroxy aryl sulfones, such as those set forth in U.S. Pat. No. 3,269,986 are also useful, e.g., bis-(4-hydroxyphenyl)sulfone; 2,4'dihydroxy-diphenyl sulfone; 5'-chloro-2,4'-dihydroxydiphenyl sulfone; 5'-chloro-2', 4,4'-dihydroxydiphenyl sulfone; 3'-chloro-4,4'-dihydroxy-diphenyl sulfone; bis-(4-hydroxyphenyl) biphenyl disulfone, etc. The preparation of these and other useful sulfones is described in U.S. Pat. No. 2,288,282 — Huissmann. Polysulfones as well as substituted sulfones using halogen, nitrogen, alkyl radicals, etc., are also useful. Dihydroxy aromatic ethers are also useful. Methods of preparing such materials are found in Chemical Reviews, 38, 414–417 (1946), and U.S. Pat. No. 2,739,171 — Linn. Exemplary of such dihydroxy aromatic ethers are 4,4'-dihydroxdiphenyl ether; 4,4'-dihydroxy-triphenyl ether; the 4,3'-4,2'-,2,2'-, etc. dihydroxydiphenyl ethers; 4,4'-dihydroxy-2,5-dimethyldiphenyl ether; 4,4'-dihydroxy-2,6-dimethyldiphenyl ether; 4,4'-dihydroxy-3,3'-di-isobutylidiphenyl ether, 4,4'-dihydroxy-3,3'-diisopropylidiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimeth-oxydiphenyl ether; 4,4'-dihydroxy-2,5-diethoxydiphenyl ether, etc. Mixtures of the dihydric phenols can also be employed, and where dihydric phenol is mentioned herein, mixtures of such materials are considered to be included. Also, the dihydric phenol materials can be utilized herein in conjunction with aliphatic diols such as ethylene glycol or propylene glycol.

The alkyl siloxanes useful in conjunction with this invention are those in which the alkyl groups attached to the silicon atom are methyl, ethyl, halomethyl, haloethyl, or mixtures thereof and in which the reactive groups are preferably halosilanes, the reactive groups numbering two per molecule. The aryl siloxanes preferred are those in which the aryl group is phenyl or halophenyl with, again, the reactive groups being preferably halogen and numbering two per molecule. Alkyl aryl siloxanes are also useful. It is well known that the lower alkyl groups and the phenyl groups impart greater heat stability to silicone materials; hence, these materials and particularly dimethylpolysiloxane are preferred. However, up to about twenty-five percent of material containing other than methyl, ethyl or phenyl groups or derivatives thereof can be tolerated without serious loss of heat resistance, including alkyl groups containing from two to five or more carbon atoms. Also, 3,3,3-trifluoropropylmethylsiloxane groups improve the oil resistance of the polymer.

While for best results and low cost the hydrolyzable, reactive groups on the ends should be silicon-bonded halogen, other reactive groups such as alkoxy, amino, aryloxy, and acyloxy can be used. Additionally, other reactive end groups on the silicones include alkyl hydroxyl, alkyl acid halides, and aromatic acid halides. While the preferred silicon-bonded (i.e., attached to Si by C—Si linkages) methyl and phenyl groups can be present in any proportion, when phenyl is used, it is preferred to have from about 40 to 60 percent methyl groups with the rest phenyl. The exact proportion to be used will depend on the particular properties desired in the final product. While both methyl and phenyl groups are superior in heat resistance, an excessive amount of either group tends toward a brittle product at very low temperatures while an excess of phenyl groups causes high rigidity at all temperatures. The above prescribed proportions result in an end product which has the most desirable combination of physical properties.

Also, silicone-organic derivatives can be used as the diorganopolysiloxane ingredient, as shown in Example 3, below.

While for best results and from the standpoint of availability and low cost, the halosilane groups are preferably chlorine, the other halides — bromine, iodine, fluorine — may also be employed.

Suitable difunctional organic acid halides include, for example, those derived from phthalic, isophthalic, terephthalic, polynuclear aromatic such as diphenic and naphthalic, sulfonyl dibenzoic and carbonyl dibenzoic acids. Also useful are difunctional organic acid halides derived from hydroxy acids and phosgene, such as derived from hydroxy benzoic and hydroxy naphthalic acids. Carbonate precursors which are suitable include phosgene and its bromine and iodine analogs (i.e., the carbonyl dihalides) as well as the bishaloformates of dihydric phenols (e.g., bischloro-formates of ehtylene glycol, neopentyl glycol, polyethylene glycol, etc.). Other carbonate precursors will occur to those skilled in the art.

While phosgene is the preferred reagent, suitable phosgene-like dibasic acid halides may be employed, such as dibromo and diiodocarbonyls.

The following examples are intended to be illustrative of the present invention.

EXAMPLE 1

Preparation of a 50% Silicone (600$\overline{Mn}$)-Poly(Bisphenol-A Terephthalate Carbonate) Segmented Copolymer Using a Bischlorosilane Silicone Dry bisphenol-A (i.e., 4,4'isopropylidene diphenol) in an amount of 570 grams (2.5 moles) immersed in dichloromethane (7 liters) in a reaction vessel was sparged air-free by dry oxygen-free nitrogen. Trimethylamine in an amount of 300 grams (5 moles) was metered into the mixture as it was gently agitated.

The trimethylamine which functions catalytically was added through the sparge tube which was immersed below the liquid surface. The resultant was a clear liquid solution. $\alpha,\omega$-dichloropoly(dimethyl-siloxane) in an amount of 600 grams (1 mole) was added to the aforesaid solution while accompanied by rapid agitation. The resultant at this juncture was a clear, non-viscous solution which was warmer due to the exothermic reaction of the reagents.

Thereafter, terephthaloyl chloride in an amount of 228 grams (1.125 moles) dissolved in air-free dichloromethane (0.5 liter) was added over a period of about 10 minutes to the rapidly agitated reactor, resulting in a clear non-viscous solution, warmed by the exothermic reaction of this added reagent.

The resultant material was then subjected to slow agitation for a period of one hour. The resultant material in this period of time becomes slightly more viscous. While accompanied by an increase in agitation, phosgene gas in an amount of 37.5 grams (0.375 moles) was metered into the reaction mixture through the sparge tube over a period of 1 hour. The final 10 percent of the phosgene was added at only 10% of the initial rate in order to assure a slow approach to the end point of the reaction. This diminution of the rate of addition of the phosgene gas assures that the final product will possess high molecular weight with good strength characteristics.

During the phosgene addition, the reaction mixture contained and further developed precipitated crystals of trimethylamine hydrochloride salt, which does not interfere with the reaction process and which occurrence results in less contamination of copolymer by salt during isolation of the copolymer from the final reaction mixture. Furthermore, during the phosgene addition the reaction mixture became progressively more viscous and more rapidly so during the final 10% of the phosgene addition. When the viscosity of the reaction mixture attained a predetermined high value, the phosgene addition was stopped and the reactions were terminated by adding a small amount of isopropyl alcohol, approximately 1 to 2 grams (0.017 to 0.033 moles) over a period of 5 to 10 minutes until no phosgene could be detected in the nitrogen sparging through the reaction mixture and out of the reactor. The final reaction mixture was a viscous solution of copolymer containing dispersed crystals of trimethylamine hydrochloride salt.

The resultant copolymer was precipitated, i.e., isolated from the reaction mixture by filtration then slow addition to a 15-fold volume of methyl alcohol while the alcohol was rapidly agitated. The copolymer precipitated as relatively small, short fibers whereas the alcohol solubilizes all unreacted reagents and by-products. The resultant copolymer was easily filtered from the alcoholic solution. It was washed with several volumes of fresh alcohol. The copolymer was then dried in a vacuum oven at 100°–130° C. for 1–3 hours. The dried copolymer (over 90% of the theoretical yield) consisted of colorless small particles which were compression molded and extruded at 180°–300° C. to become relatively colorless transparent, flexible and strong fabricated articles. The copolymer contained 50% by weight silicone (soft component) and 50% by weight polyester-polycarbonate block copolymer (hard component) in which the mole ratio of ester (and acid halide) to carbonate was 3:1 (i.e., the hard component consists of 75 mole percent bisphenol terephthalate and 25 mole percent bisphenol carbonate, approximately) as determined by nuclear magnetic resonance spectroscopy.

EXAMPLE 2

Preparation of a 60% Silicone(1462$\overline{Mn}$) Poly(Bisphenol-A Terephthalate Carbonate) Segmented Copolymer Using a Bischlorosilane Silicone This example differs from Example 1 regarding the silicone molecular weight and content in the copolymer, the ratio of terephthalate to carbonate, the type of solvent, and several procedural details.

Dry bisphenol-A (150.1 grams) was weighed and quantitatively transferred in air to a 1 liter measuring funnel attached to a 5 liter reaction flask. Dry technical grade tetrachloroethane (850 ml) was added to the bisphenol A and this mixture was sparged by dry, air-free nitrogen for about 3 minutes to remove air. Dry analytical reagent grade pyridine (162 ml) was added to this mixture and sparging continued for about 5 minutes, producing a clear, nearly colorless solution, which was added to the attached reaction flask.

Into the same funnel was measured tetrachloroethane (500 ml) and about 325 gm. of a $\alpha,\omega$-bischloropoly(dimethylsiloxane), having a number average molecular weight (Mn) of 1462, (0.222 Mole) as determined by titration of the chlorine end groups. This clear colorless solution was sparged by nitrogen for 5 minutes to remove dissolved air, then added to the rapidly agitated reactor over a period of 36 minutes. Subsequently, after 24 minutes of slow agitation of the reactor, 990 mls of a dry and air-free solution consisting of terephthaloyl chloride (79.3 grams) in tetrachloroethane was added to the reactor over a period of 31 minutes, while again rapidly agitating the reactor. Then after 29 minutes of slow agitation, phosgene gas was sparged into the bottom of the reaction mixture over a period of 2½ hours, while agitating rapidly, until unreacted phosgene was detected over the reaction mixture and the reaction mixture became much more viscous than it was before phosgene addition. Unreacted phosgene was detected by suspending in the reactor vapor exhaust port an indicator paper prepared by soaking a filter paper strip in a carbon tetrachloride solution of equal weights of diphenylamine and p-dimethylaminobenzaldehyde (according to the test described in the Merck Index, eighth edition, page 823).

The viscous clear reaction mixture was then poured slowly into 7 gallons of methanol agitated rapidly, which precipitated the copolymer product in the form of small diameter short fibers, but which dissolved and extracted from the copolymer the pyridinium hydrochloride byproduct and the tetrachloroethane solvent. The copolymer precipitate was recovered by filtration, rinsed with several portions of methanol, and vacuum dried 2 hours at 120° C. Copolymer yield was 454 grams, containing 60 wt.% silicone and a 9:1 mole ratio of terephthalate to carbonate.

The white fluffy copolymer was compression molded at 285°–295° C. to very strong, flexible, clear, colorless sheets.

A separate portion of the fluffy copolymer was extruded at 280°–300° C. to form smooth, very strong, flexible, clear colorless sheeting and tubing.

Tensile tests (ASTM D882) of the compression molded and the extruded sheetings (3 samples each provided the following data:

|  | Molded | Extruded |
|---|---|---|
| Ultimate Tensile (psi) | 1226–1493 | 1350–1650 |
| Ultimate Elongation (%) | 310–400 | 420–460 |
| Modulus at 100% Elongation (psi) | 640–800 | 693–906 |
| Tear Propagation Resistance (pli, Die B) | 173–213 | 156–187 |

Sheets of this copolymer were heat sealed together to give strong bonds between the sheets.

Extraction of the extruded and molded copolymer by hot petroleum ether (b.p. 30°–60° C.) for 16 hours removed only 3–3.5% of the sample weight, with no discernible difference between extruded and molded samples in spite of their severe swelling during extraction. This severe treatment demonstrates the high extent of conversion of the reagent silicone to high molecular weight copolymer, which is not soluble in hot petroleum ether, and it is evidence that the copolymer is stable during extrusion at high temperatures.

This material can be fabricated into bags and other articles which can be steam sterilized at 120° C. without significantly losing tensile strength.

Tubing and sheets of this copolymer were cemented together very strongly by solvents such as methylene chloride, 1,1,2,2-tetrachloroethane, methyl ether ketone, and toluene. However, due to the high molecular weight of the silicone portion of the polymer, and due to the very high ratio of terephthalate to carbonate, the material does not seal well by radio frequency, dielectric means.

A similar material can be prepared by the above technique which has improved radio frequency dielectric sealing characteristics, when the above bis-chlorodimethylpolysiloxane is replaced with an equal weight of a similar material having a molecular weight of 800.

EXAMPLE 3

Preparation of a 25% Silicone, 25% Poly(ethylene Ether), (Bisphenol-A Terephthalate Carbonate Segmented Copolymer Using a Silicone Biscarbinol Using essentially the same procedures as Example 1, bisphenol-A (15.52 grams) in a glass reaction vessel was dissolved by adding 18.1 ml. pyridine and 125 ml. dichloromethane to provide a clear colorless solution. To this solution was added 250 ml. of a dichloromethane solution containing 25 ml. (0.011 Mole) of a silicone bis-carbinol having a number average molecular weight of 2270. This silicone biscarbinol has a molecular structure consisting of a central segment of $\alpha,\omega$-bis(3-propoxy)-poly-(dimethylsiloxane) covalently bonded to end segments of dihydroxy-poly-(ethylene ether) wherein the poly(dimethylsiloxane) derivative constitutes 50 wt.% of the molecule, as illustrated below:

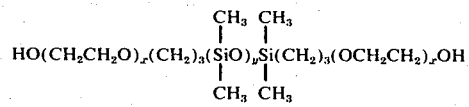

This structure was verified by prior analysis by nuclear magnetic resonance spectroscopy. To this mixture at room temperature was added about 200 ml. of a solution of terephthaloyl (7.6 grams) chloride dissolved in dichloromethane. After 1 hour of gentle agitation at room temperature, 1150cc of phosgene gas was sparged into this reaction mixture over a period of about 2½ hours, resulting in a slightly viscous clear colorless solution, having a reacted terephthalate/carbonate ratio of 1.25/1. This solution was poured into 7 liters of methanol to obtain a white precipitate of the copolymer product, which was filtered and washed with fresh methanol, then dried 2 hours at 105° C. Copolymer yield was 36.2 grams (79.6% of theoretical). This material compression molded at 165° C. into a 0.015 inch thick sheet was clear and strong, having tensile test results as follows: 920 psi ultimate tensile stress, 250% ultimate elongation, and 260 psi tear propagation strength. Its durometer hardness was 91 shore A. This copolymer was stiffer, harder and stronger than equivalent copolymers which did not contain polyether segments. It is heat-sealable by radio frequency dielectric techniques.

EXAMPLE 4

Preparation of a 50 wt.% Silicone Copolymer Derived from $\alpha,\omega$-Dichloropoly(dimethylsiloxane) of 516$\overline{M}n$, a 1:1 Mole Ratio of Resorcinol to Bisphenol-A and a 4:1 Mole Ratio of Terephthaloyl Chloride to Phosgene Resorcinol (5.33 grams), bisphenol-A (11.06 grams), and dichloromethane (600 ml.) in a 1-liter reactor were sparged air-free by nitrogen, then dissolved by adding pyridine (30 ml.). A solution (250 ml.) containing about 25g. of $\alpha,\omega$-dichloro-poly(dimethylsiloxane), having an average molecular weight of 516, in dichloromethane was added to this reactor over a period of 15 minutes, while rapidly agitating the reaction mixture at room temperature. After 12 more minutes, to the resultant clear solution was added a solution (150 ml.) of terephthaloyl chloride (7.85 grams) in dichloromethane over a period of 18 minutes. Thereafter the reaction solution was heated at reflux for 1 hour, and then left to cool to room temperature for 54 minutes. Then phosgene gas (650cc) was sparged into the bottom of the reactor over a period of about 2 hours, after which excess phosgene was detected in the vapors exiting from the reactor and the reaction mixture was a slightly viscous clear colorless solution of approximately 900 ml. volume. The copolymer was isolated and purified by pouring this reaction mixture into 6 liters of methanol, filtering, and rinsing with methanol and vacuum drying as described in the previous examples. The copolymer yield was 33.8 grams of colorless small fibers.

Compression molding this copolymer at 400° F. produced a nearly clear very flexible soft (78 Shore A hardness), odorless, strong, tear resistant sheet. Tensile test results for triplicate samples of this molded copolymer sheet are tabulated below:

| | |
|---|---|
| Ultimate Tensile Stress (psi) | 1152–1319 |
| Ultimate Elongation (%) | 638–670 |
| Modulus at 100% Elongation (psi) | 304–359 |
| Tear Propagation Resistance (pli, Die B) | 170–189 |

The apparent softening temperature of this copolymer was about 130° C. Sheets of this copolymer were heat sealed very well, by radio frequency dielectric techniques.

EXAMPLE 5

Preparation and Properties of a 55 Wt.% Silicone Copolymer Derived from $\alpha,\omega$-Dichloropoly (dimethylsiloxane) of 2375 Molecular Weight, 4:1 Mole Ratio of 1,4-Butanediol to Bisphenol-A, and a 10:1 Ratio of Terephthaloyl Chloride, and Phosgene Into a one-liter reactor bisphenol-A (5.77 grams), dichloromethane (500 ml.), and pyridine (9.2 ml.) was added to obtain a clear solution. To this was slowly added a solution (264 ml.) of 25 g. of a dichlorodimethylpolysiloxane (molecular weight 2375) and terephthaloyl chloride (13.93 grams) in dichloromethane, over a period of 16 minutes. After 1 hour there was added a solution (102 ml.) of 1,4-butanediol (6ml.) and pyridine (11 ml.) in dichloromethane, over a period of 64 minutes. During these reactions, the temperature in the reactor was maintained at 21.5°–26.5° C. At the end of these reactions there was a 20% theoretical excess of butanediol over the equivalence point of the reactants, thereby presumably producing copolymers whose ends are terminated by butanol groups.

Isolation of a portion of the copolymer from this reaction mixture, using the methods described in previous examples, indicated the yield was 78.5% of the theoretical amount of copolymer. The copolymer isolated at this stage molded at 395° F. was translucent, colorless and very weak, with a softening temperature of 150° C.

The reaction was continued by sparging phosgene (150cc) into the rapidly agitated reaction solution over a period of 68 minutes, after which the reaction solution was much more viscous and there was indication of the presence of excess phosgene in the reactor. Isolation of copolymer at this stage, by the usual precipitation and drying methods, indicated a copolymer yield of 88.5% of the theoretical. This copolymer molded at 390°–420° F. as a sheet which was nearly transparent, strong (ultimate tensile stress approximately 1000 psi), very flexible, sealable by dielectric heating, and had a softening temperature of 175° C. These much improved properties clearly demonstrate the necessity of the final phosgene addition and the consequent formation of carbonate linkages in the copolymers. The addition of from 10 to 90 mole percent alkylene diol, as a partial substituted for the dihydric phenol, can permit longer polymer blocks to improve tensile strength without loss of the capability for R.F. dielectric sealing.

In the further practice of the present invention and by way of illustrating additional examples, the bisphenol-A is replaced by an equivalent molar amount of resorcinol. Such a procedure will yield copolymers which have similar properties and stabilities, but which may be based on even lower molecular weight reactive silicones. It has been discovered that the resulting copolymers will respond in an excellent manner to dielectric heating equipment. It is also appropriate to replace only a portion of the bisphenol-A with resorcinol.

In the examples, the bisphenol-A is replaced wholly or in part by one or more of the following: phenolphthalein, hydroquinone, 2-methylresorcinol, 2,5-dimethylhydroquinone, or other dihydric phenols such as those well known in prior practice of polycondensation reactions.

At the same time and in other examples, or in the first mentioned example, the terephthaloyl chloride is replaced by isophthaloyl chloride. In yet another embodiment only a portion of the terephthaloyl chloride is replaced. In still other examples, the terephthaloyl chloride is replaced in part or wholly by succinoyl chloride or adipoyl chloride as well as other organic diacid halides, i.e., those that are well known in the prior art with regard to polycondensation reactions of the type contemplated herein.

As will be appreciated, the catalyst trimethylamine which enters into the reaction to some extent is replaced in some of the examples by other trialkylamines, such as triethyltripropyl tributyl-amines; or by pyridine derivatives, such as 2,4,6-dimethyl-pyridine, 2,6-dimethylpyridine, 4-methoxypyridine, 2,6-dimethyl-pyridine, 2,6-dimethyoxypyridine, 4-dimethylaminopyridine; or by other aromatic heterocylcic amines, such as quinoline and its derivatives.

While a considerable number of applicable siloxanes were set forth in the above, the reactive poly(dimethylsiloxanes) found most useful in carrying out the concepts of the invention have molecular weights ranging from approximately 300–3,000. Partial replacement of methyl in these silicones by ethyl or phenyl produces improved low temperature flexibility, oxidative stability and strength of the resultant copolymers.

With regard to the solvents it is within the purview of the present invention to replace the methylene chloride by other solvents which are not reactive in the process and which act as solvents to the reagents and may or may not dissolve the resultant copolymers. Alternate solvents include halogenated aliphatics, such as chloroform, 1,1-dichloroethane, 1,1,1-trichloro-ethane, 1,1,2,2-tetrachloroethane; halogenated aromatics, such as chlorobenzene, 1,2-dichlorobenzene, 1,2,4-trichlorobenzene; aromatic hydrocarbons, such as benzene, toluene and xylene; ketones such as acetone, methylethyl ketone and cyclohexanone; and ethers, such as tetrahydrofuran and 1,2-dimethyloxethane. The choice of solvent depends on the composition and structures of copolymer and reagents employed, consequently, perhaps not all the solvents enumerated will be as efficacious with regard to all the alternative copolymers mentioned.

EXAMPLE 6

Preparation of a 50% by Weight Silicone Copolymer Derived from $\alpha,\omega$-Dichloropoly(dimethylsiloxane) Having a Molecular Weight of 850 and 50% by Weight of Bisphenol-A Terephthalate and Carbonate, With a 1/1 Mole Ratio of Terephthalate to Carbonate By procedures similar to those described in Example 1,400 ml. of methylene chloride, 20 ml. of pyridine, and 18.8g. of bisphenol-A were placed in a reactor and mixed. Twenty-five grams of the polydimethylsiloxane were added in the form of 230 ml. of a methylene chloride solution, slowly over a period of 25 minutes, to insure the presence of a large excess of bisphenol-A through the reaction, to increase the yield of copolymer comprising dimethylpolysiloxane units terminated at each end with a separate bisphenol-A unit having a free end reactive hydroxyl group.

Thereafter, phosgene was slowly bubbled through the reaction mixture over a period of 45 minutes, with a total of 750cc of phosgene being added. After the 45 minutes, excess phosgene was detected over the reaction mixture.

The resulting copolymer exhibited a softening temperature range of 125°–160° C. as measured on a Fisher-Johns melting hotplate. The polymer was molded at 175° C. to make a strong flexible generally transparent sheet. The sheet material was found to be sterilizable in steam at 120° C. without flowing or adhesion to itself or the container in which it was held. Films of the copolymer were easily heatsealed using radio frequency dielectric techniques to give strong bonds. The dielectric sealing apparatus used comprise a pair of brass electrodes measuring ¼ inch by 4 inches of contact area with a three kilowatt generator set at a 70 percent power output, the sealing impulse being less than 7 seconds.

EXAMPLE 7

Preparation of a 50% Silicone (Molecular Weight 824) Poly(Bisphenol-S Terephthalate Carbonate) Segmented Copolymer in Which the Mole Ratio of Terephthalate to Carbonate is 3/1

Into a reactor was placed 50 ml. of methylene chloride, 15 ml. of pyridine, and 14.7g. of a dihydric phenol known as bis-phenol-S (4,4'-bis(hydroxyphenol) sulfone).

To this mixture was added as a 100 ml. solution in methylene chloride, 20g. of $\alpha,\omega$-dichloropolydimethylsiloxane having an average molecular weight of 824.

After reaction was complete, 100 ml. of methylene chloride solution containing 5.25g. of terephthaloyl chloride was added. Thereafter, phosgene was bubbled through the reactor until the reaction was complete and excess phosgene was detected over the reaction mixture.

The resulting product was an extremely viscous copolymer which could be molded at 410° F. as a hazy white sheet, and which was strong and flexible. The sheet was readily sealed by R.F. dielectric heat sealing, and was steam sterilizable at 120° C. without becoming adhesive or distorting.

EXAMPLE 8

Preparation of 50 Wt.% Silicone Copolymer Derived From $\alpha,\omega$-Dichloropolydimethylsiloxane Having a Molecular Weight of 896 and 50% by Weight of Bisphenol A Terephthalate and Carbonate With a 4:1 Mole Ratio of Terephthalate to Carbonate This experiment used procedures similar to those described in Example 1. To a reaction vessel was added 570g. of dichloromethane, 18.7 ml. of pyridine, and 17.65g. of bisphenol A. Twenty-five grams of the polydimethylsiloxane described above were then added slowly until the reaction was complete, followed thereafter by the addition of 8.02g. of terephthaloyl chloride.

Phosgene was then bubbled through the reaction mixture until the reaction was complete.

After separation of the resulting copolymer from the solvent, the copolymer was molded to form a transparent flexible sheet which was capable of dielectric R.F. heat sealing, and survived steam sterilization without undue softening for 40 minutes at 120° C.

That which is claimed is:

1. The method of preparing a plastic material capable of forming flexible films which can be heat sealed by radio frequency dielectric sealing processes, and which have good tensile strength at heat-sterilizing temperatures, which method comprises:
    reacting one molar part of a diorganopolysiloxane having hydrolyzable end groups, with more than 2 and less than 10 molar parts of a dihydric phenol;
    reacting the resulting product with a difunctional organic acid halide to produce polyester moieties at each end of the polysiloxane by chain-forming reaction between the remaining dihydric phenol and the difunctional organic acid halide; said organic acid halide being present in less than a stoichiometric quantity sufficient to react completely with said dihydric phenol; and
    thereafter reacting the resulting product by gradual addition of an organo carbonate precursor, said polysiloxane being present in the final product in the amount of 45 to 70 percent by weight, and having a molecular weight of 300 to 3,000, the mole ratio of the difunctional organic acid halide to the organo carbonate precursor being from 1/2 to 9/1.
2. The method of claim 1 in which said organo carbonate precursor is phosgene.
3. The method of claim 2 in which said silicone has a molecular weight of 500 to 1200.
4. The method of claim 3 in which said dihydric phenol is bis-phenol A.
5. The method of claim 4 in which said organic acid halide is terephthaloyl chloride.
6. The method of claim 5 in which the ratio of terephthaloyl chloride reacted, to the amount of phosgene reacted, is from 1/1 to 5/1.
7. The method of claim 6 in which said organo polysiloxane is a dimethylpolysiloxane.
8. The method of claim 7 in which said hydrolyzable end groups are silicon-bonded chlorine.
9. The method of claim 3 in which said dihydric phenol is a mixture of bis-phenol A and resorcinol.
10. The method of claim 3 in which said dihydric phenol is bisphenol-S.
11. The method of claim 3 in which from 10 to 90 mole percent of the dihydric phenol is replaced by an alkylene diol.
12. The method of preparing a plastic material capable of forming flexible films by extrusion which can be heat-sealed by Radio frequency dielectric sealing processes, and which have good tensile strength at autoclaving temperatures, which method comprises:
    reacting one molar part of a diorganopolysiloxane having a molecular weight of 700 to 1000 and having —SiCl end groups, with more than 2 and less than 10 molar parts of 4,4'isopropylidenediphenol (bisphenol A);
    reacting the resulting product with a difunctional organic acid halide of the formula

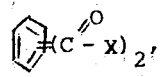

where X is halogen, to produce polyester moieties at each end of the polysiloxane by chain-forming reaction between the remaining dihydric phenol and the difunctional organic acid halide, said organic acid halide being present in less than a stoichiometric quantity to react completely with said dihydric phenol; and thereafter reacting the resulting product by gradual addition of phosgene, said polysiloxane being present in the final product in the amount of 45 to 60 percent by weight, the mole ratio of the difunctional organic acid to the phosgene being from 1/1 to 5/1.

13. The method of claim 12 in which the amount of polysiloxane present is from 50 to 60 percent by weight.

14. A block copolymeric plastic material capable of forming flexible films by extrusion comprising:
blocks of diorganopolysiloxane;
polyester blocks comprising alternating dihydric phenol and difunctional organic acid residues, said polyester blocks being bonded to each end of the organopolysiloxane blocks, whereby each polyester block defines a first, polysiloxane-bonded end and a second end; and
polycarbonate blocks chemically bonded to said second ends of the polyester blocks, said polycarbonate blocks comprising the reaction product of a dihydric phenol and an organo carbonate precursor; from 45 to 60 percent by weight of said copolymer being said polysiloxane blocks, said polysiloxane blocks having a molecular weight of 300 to 3000, the mole ratio of difunctional organic acid residue present to organo carbonate precursor residue present being from 1/2 to 9/1.

15. The composition of claim 14 in which said organo carbonate precursor is phosgene.

16. The composition of claim 15 in which said diorganopolysiloxane blocks each have an average weight of 500 to 1200.

17. The composition of claim 16 in which said dihydric phenol is bis-phenol A.

18. The composition of claim 17 in which said difunctional organic acid residue is terephthalate.

19. The composition of claim 18 in which the molar ratio of terephthalate present to the amount of phosgene reacted is from 1/1 to 5/1.

20. The composition of claim 19 in which said organopolysiloxane is a dimethylpolysiloxane.

21. The composition of claim 16 in which said dihydric phenol is a mixture of bisphenol A and resorcinol.

22. The composition of claim 16 in which said dihydric phenol is bisphenol-S.

23. The composition of claim 16 in which from 10 to 90 mole prcent of the dihydric phenol is replaced by an alkylene diol.

* * * * *